United States Patent [19]

Herington

[11] Patent Number: 4,468,841

[45] Date of Patent: Sep. 4, 1984

[54] CLAMP FOR USE WITH A CLIPBOARD OR THE LIKE

[76] Inventor: Thomas H. Herington, 203 Reed Blvd., Mill Valley, Calif. 94941

[21] Appl. No.: 431,353

[22] Filed: Sep. 30, 1982

[51] Int. Cl.$^3$ .............................................. B42F 1/00
[52] U.S. Cl. .................................. 24/67 R; 24/67.5; 24/67.7; 24/527
[58] Field of Search ............... 24/67 R, 67.9, 67.5, 24/67.3, 67.7, 547, 551, 552, 553, 554, 555, 556, 522, 524, 527

[56] References Cited

U.S. PATENT DOCUMENTS

| | | | |
|---|---|---|---|
| 551,259 | 12/1895 | Calkins | 24/527 |
| 1,760,346 | 5/1930 | Correa | 24/527 |
| 2,249,651 | 7/1941 | Gilbert | 24/527 |
| 2,674,186 | 4/1954 | Cameron | 24/527 |
| 2,943,372 | 7/1960 | Fleming | 24/67.7 |
| 2,996,774 | 8/1961 | Sutton | 24/67.7 |
| 3,085,777 | 4/1963 | Lewtan et al. | 24/67 R |
| 3,105,279 | 10/1963 | Westhoff | 24/67.5 |
| 3,336,642 | 8/1967 | Armacost | 24/527 |

FOREIGN PATENT DOCUMENTS 19983 of 1914 United Kingdom ............... 24/67 R

Primary Examiner—Victor N. Sakran
Attorney, Agent, or Firm—Robert Charles Hill

[57] ABSTRACT

A clamp for holding an object in working relationship with a work surface. The object may be a calculator or the like and the work surface may be a clipboard or the like.

5 Claims, 10 Drawing Figures

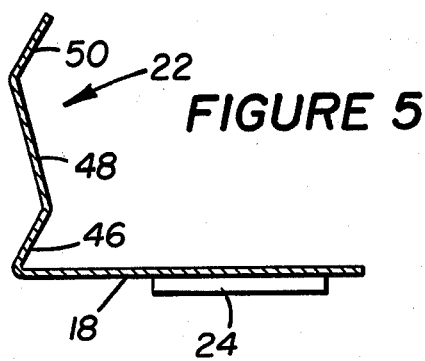
FIGURE 5
FIGURE 3
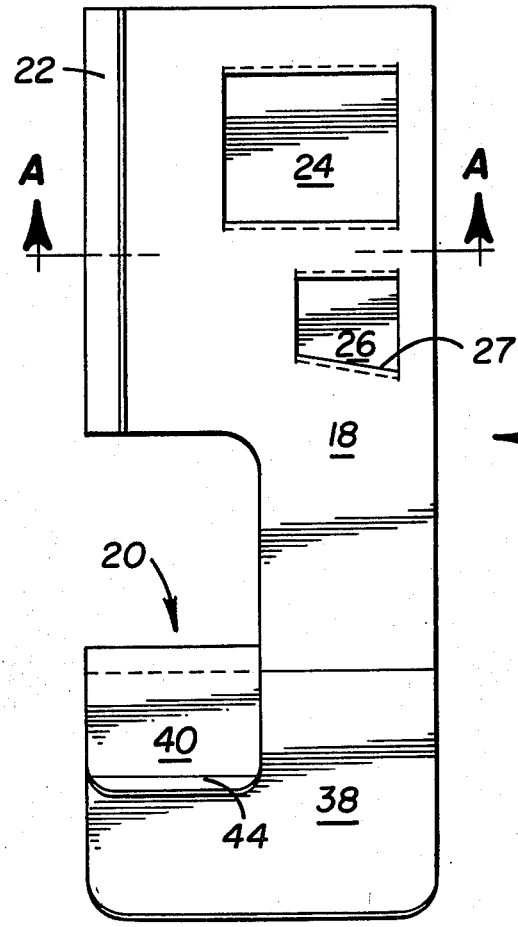
FIGURE 4
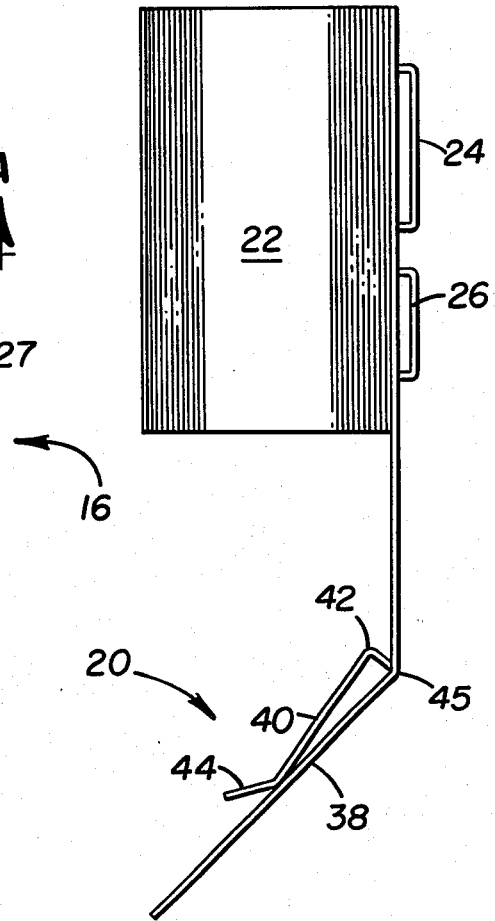

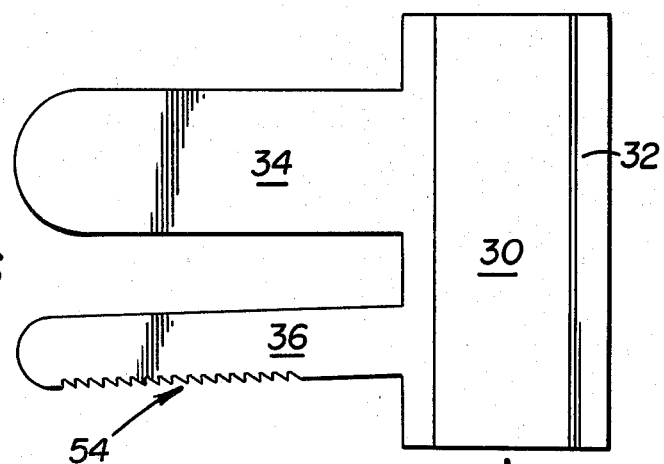
FIGURE 6
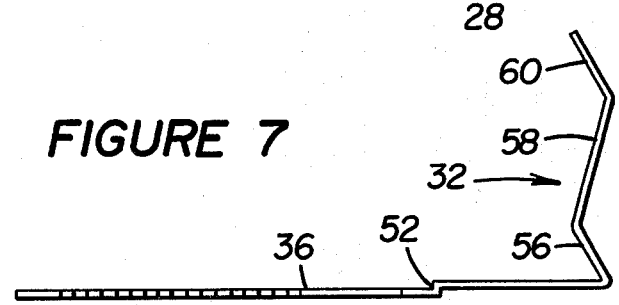
FIGURE 7
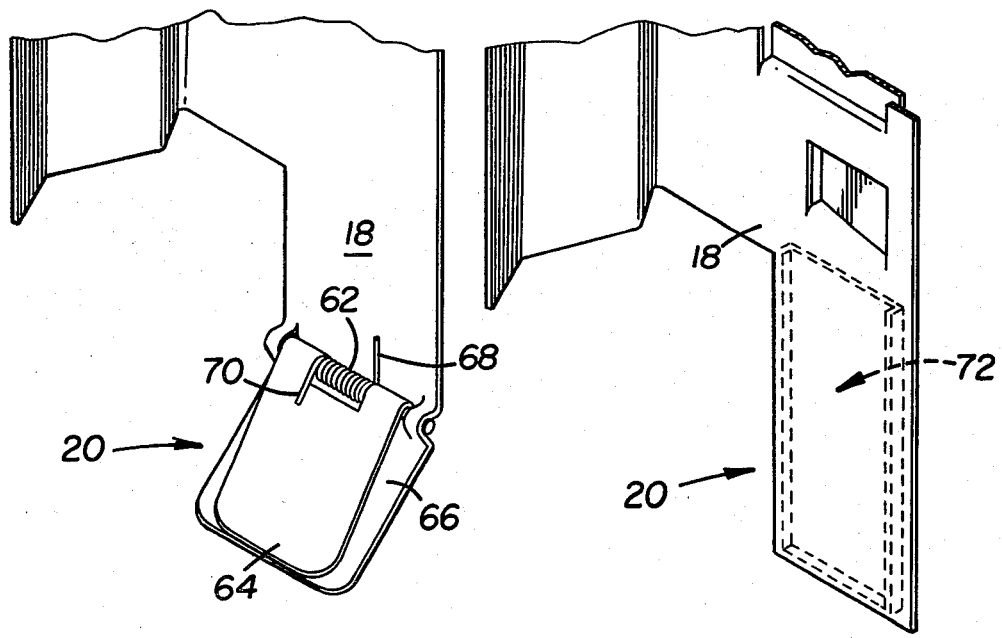
FIGURE 8
FIGURE 9

CLAMP FOR USE WITH A CLIPBOARD OR THE LIKE

This invention relates to a clamp for holding an object in a working relationship with a work surface, such as a clipboard. The clamp is adapted to be releasably secured to the work surface and is further adapted to hold objects of varying sizes and shapes.

BACKGROUND OF THE INVENTION

When collecting data and making calculations using such data, it is a frequent practice to use some form of a portable work surface to provide a rigid working area. Such work surfaces are frequently the conventional clipboard which constitutes a durable hard flat surface of metal, wood or plastic with a spring loaded clamp or clip fastened at one side. The flat surface provides the work surface and the clamp provides a means for holding papers or the like on the surface.

Calculations are frequently carried out with the aid of what are today known as "hand-held calculators." Such calculators are frequently about 3 inches wide, 6 inches long and about 1 inch deep and are capable of performing simple arithmetic operations as well as many complicated and programable mathematical calculations.

Persons using such clipboards and calculators on a routine basis have found a need to provide easy and free access to both the clipboard and the calculator. Some persons hold the clipboard and calculator in one hand while writing or performing other operations with the other hand. Such activities present a possibility of dropping or damaging the calculator and do not permit the user to easily keep the calculator and clipboard in handy access.

The present invention is intended to provide a means for holding a calculator or the like in a working relationship with a clipboard or other work surface.

OBJECTS OF THE INVENTION

An object of the present invention is to provide a releasable clamp for holding an accessory object in a working relationship with a work surface.

A further object in accord with the preceding object is to provide a clamp which may be releasably clipped to a clipboard and which is adjustable to releasably hold an object, such as a calculator, in a desirable and useful working relationship with the clipboard.

A further object in accord with the preceding objects is to provide a holder for an object to be used with a work surface wherein the holder forms a two sided clamp which may hold objects of varying sizes and shapes and which will provide a positive but releasable holding grip on the object.

Further objects and features of the present invention will be readily apparent to those skilled in the art from the appended drawings and specification illustrating preferred embodiments wherein:

BRIEF DERSCRIPTION OF THE DRAWINGS

FIG. 3 is a front elevational view of the first formed member of the clamp.

FIG. 4 is a side elevational view of the first formed member of the clamp.

FIG. 5 is a sectional view along lines A—A of FIG. 3.

FIG. 6 is a front elevational view of the second formed member of the clamp.

FIG. 7 is a side elevational view of the second formed member of the clamp.

FIGS. 8 and 9 are partial perspective views of alternative forms for the means for attaching the clamp to a work surface.

DETAILED DESCRIPTION OF THE DRAWINGS

Figure 1:
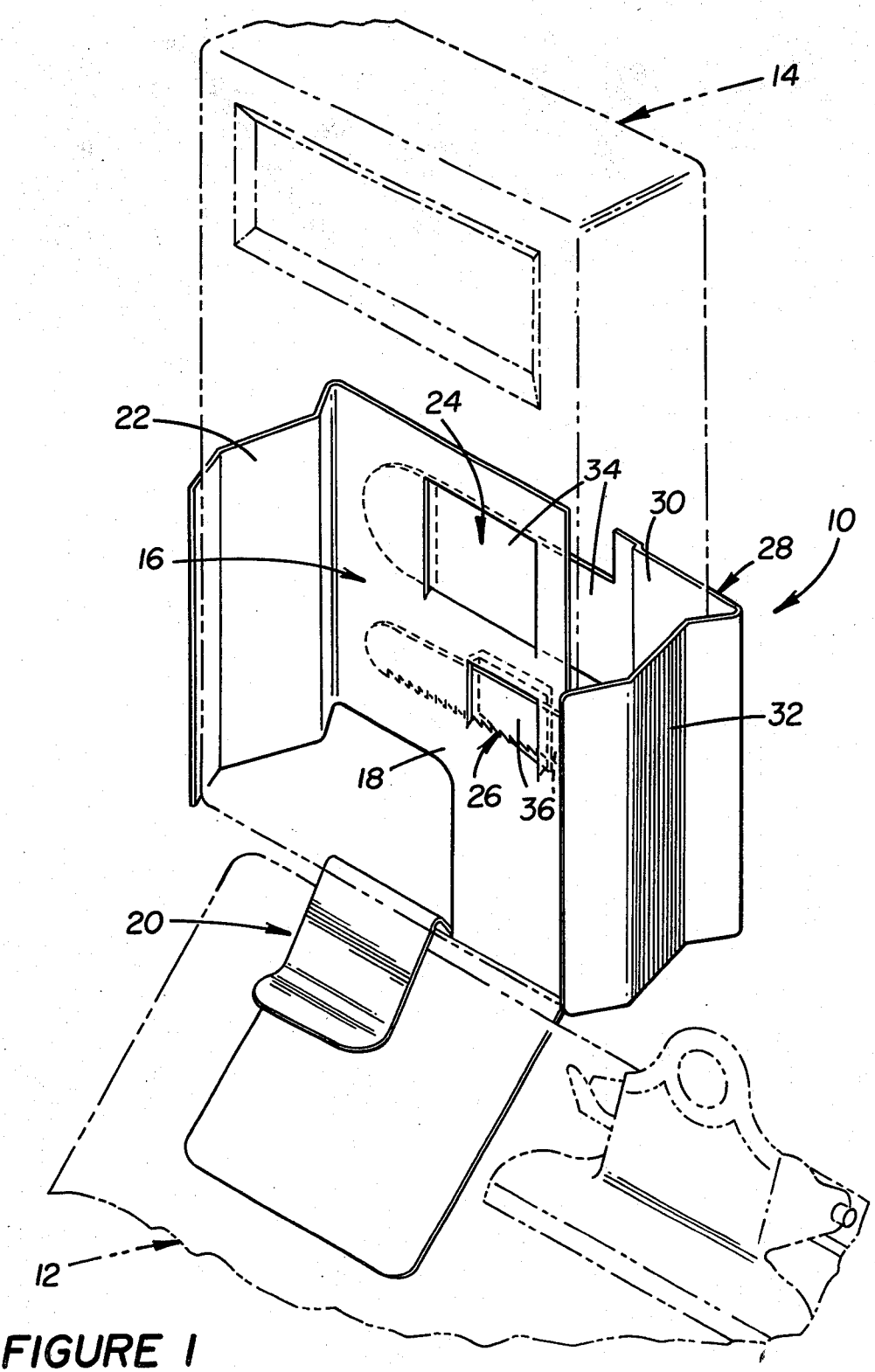
FIG. 1 is a perspective view of the clamp of the present invention shown in one form of use with a clipboard and holding an object.

The adjustable, fastenable clamp 10 of the present invention is shown in FIG. 1 in perspective as attached to a clipboard 12 (shown in phantom) and holding an object 14 (shown in phantom). The clamp 10 comprises two formed members; member 16 which includes a body portion 18, a fastener 20, one side 22 of a two sided clamp, and means 24 for supporting with means 26 for releasably locking a second part of the clamp 10. The second part comprises a second formed member 28 having a central portion 30, a second side 32 of the two sided clamp, and support means 34 with locking means 36 which individually extend from the central portion 30 and cooperate with the means for supporting 24 and the means for releasably locking 26 to accomplish the desired function as will be more fully described hereinafter.

Figure 2:
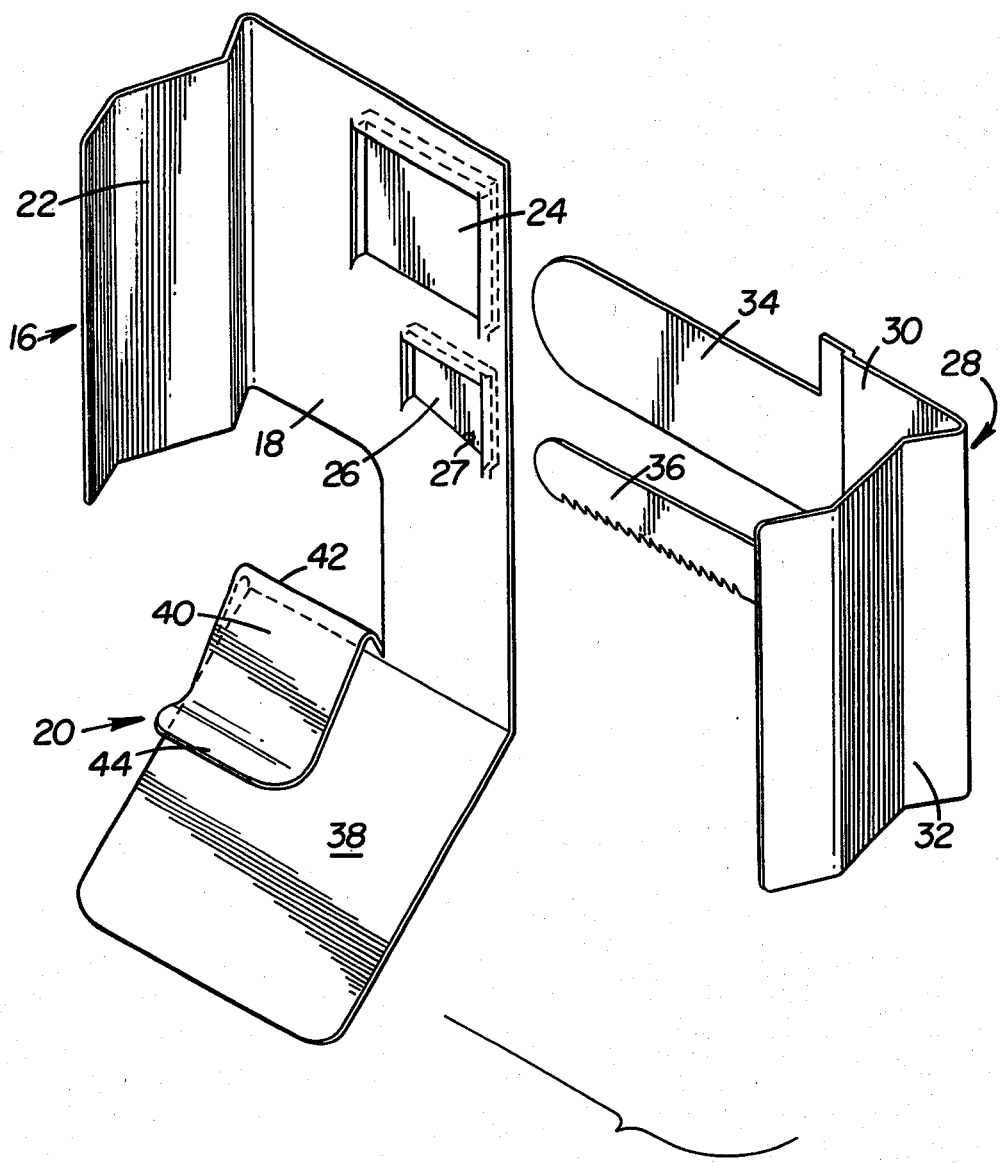
FIG. 2 is an exploded perspective view showing the two formed members of the clamp.

FIG. 2 shows the two formed members of the clamp in exploded perspective and without the association with a clipboard or supported object. It should be apparent that the means 20 for releasably fastening the first formed member 16 is, as shown, formed from a portion of the member 16 and comprises aback plate 38 and a spaced front plate 40. The spacing between the back and front plate is adapted to accommodate the work surface or clipboard 12 as shown in FIG. 1. The front plate 40 has a spring bias formed by the hinge 42 and a raised lip 44 to permit the front plate to be lifted to remove the clamp 10 from the clipboard 12.

FIGS. 3, 4 and 5 illustrate details of the forming of the member 16. It should be apparent that the first formed member 16 may be formed from a single sheet of metal with the supporting means 24 and the locking means 26 pressed from the body portion 18. It should be noted that the means for releasably locking 26 is formed as a slot having sides and a back with entry and exit cutout portions parallel to each other and parallel to the form of supporting means 24; however, one side 27 of the locking slot 26 is not parallel to the other side thus forming a slot with a reducing cross-section dimension in a direction toward the clamp 22 side of the body portion 18. The fastening means 20 is also pressed from the body portion 18 and then formed to produce the back plate 38, the front plate 40, the hinge 42 and the raised lip 44. It should be noted that there is an angle formed at 45 between the body portion 18 and the fastening means 20. This angle permits the object held by the clamp to be held in a position to permit the best access between the object and the clipboard. A preferred angle is about 45°.

As shown in FIG. 5, the one side clamp 22 is formed to permit the clamp to accommodate various sizes and shapes of objects. The first portion 46 provides an initial stand-off space between the clamp body portion 18 and a held object. The clamp is then further formed with a flat surface 48 and a return bent end 50. In general, an object would be held between the surface 48 and the end 50 with objects of varying sizes and shapes bracketed in the joint between surface 48 and end 50.

FIGS. 6 and 7 illustrate details of the formation of the second formed member 28 with its central portion 30, the second side clamp 32, and the finger-like support means 34 and fingerlike locking means 36. The central portion 30 is pressed to produce a slight offset at 52 to establish the needed offset for support means 34 and locking means 36 to accomplish alignment with the slots of supporting means 24 and means for releasably locking 26 in member 16.

The locking means 36 is formed with a less than perpendicular angle with the central portion 30 to accomplish a press fit between two halves of the assembled clamp. A preferred angle for the less than perpendicular is about 88°. The locking means is further formed with repeating saw teeth 54 having their flat surface facing the central portion 30 and their sloping surface facing away from the central portion 30.

As shown in FIG. 7, the second side clamp 32 is formed similarly to the first side clamp 22 establishing a stand-off surface 56, a flat surface 58 and a return bent end 60.

When assembled, as shown in FIG. 1, the two formed members 16 and 28 form the adjustable, fastenable clamp 10 of the present invention. The saw toothed surface of the locking means 36 cooperates with the sloping, non-parallel side 27 of the slot of the means for releasably locking 26 and the less than perpendicular angle for the means 36 presses the saw teeth against the edge of side 27 to accomplish a locking action between the two formed members of the clamp. The cooperation between the support means 34 and means for supporting of slot 24 provides guidance and support between the two formed members. This locking and support arrangement is readily releasable by lifting the saw tooth latch between means 36 and edge 27 to permit the two formed members to be separated.

FIGS. 8 and 9 illustrate alternative forms for the releasable fastening means 20. FIG. 8 illustrates a spring biased form with a spring 62 wraped around a pin (not shown) extending through a hinge formed in the front plate 64 and back plate 66. The spring has one end 68 extending into cooperation with the body portion 18 and the other end 70 extending into cooperation with the front plate 64.

FIG. 9 illustrates a fastening arrangement that is particularly adapted for use with a clipboard having an extending bracket from the spring clip of the clipboard. Such a clipboard is sold under the trade name of NATIONAL and is illustrated in U.S. Pat. No. 2,996,774. In this form of fastening means, the first formed member is pressed and cut to form a hollow slot 72 extending from the body portion 18. The slot is formed by forming the edges of the sheet of metal from which the first member 16 is formed. In this form there is no need for establishing an angle between the assembled clamp and the fastening means because the extending bracket from the NATIONAL clipboard establishes the desired angle.

Figure 10:
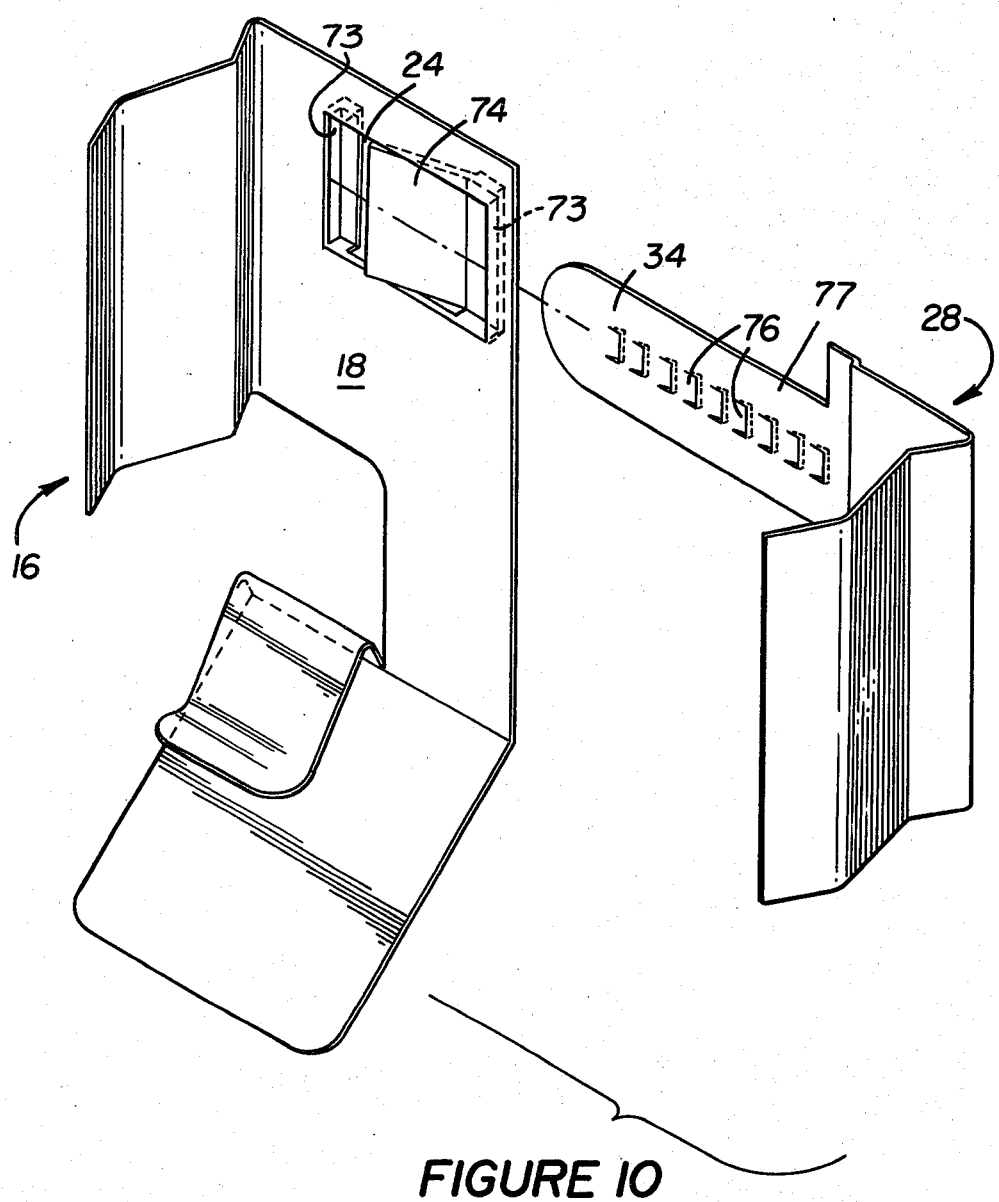
FIG. 10 is an exploded perspective view showing the two formed members of the clamp with an alternate form of locking means.

FIG. 10 illustrates the two formed members of the clamp in exploded perspective with an alternate form of locking means. In this embodiment the supporting means 24 has slot-like elements 73 formed from the back of body portion 18 and a resilient latch portion 74 which cooperates with spaced apart notches or detents 76 on elongated flat finger-like element 77 in support means 34 of second formed member 28 to accomplish the desired releasable locking.

From the foregoing description of the parts and their formation, it should be readily apparent how the present invention is used. It has particular application to data collection and processing using a hand held clipboard. It is also useful in supporting an object on a work surface in many other positions; such as, a map or directions supported on a leg clamped work surface as used by a airplane pilot. The arrangement here illustrated permits the user to have both hands free except when using the clipboard or object and insures that the clipboard and object will not be dropped or separated. Other specific uses should be readily apparent.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

The subject matter to be claimed is:

1. An adjustable, fastenable clamp for support of an object on a work surface comprising,
   (a) a first formed member having:
     a body portion,
     means for releasably fastening said first member to said work surface,
     means forming one side clamp of a two sided clamp for said object,
     and separate aligned means for supporting and separate aligned means for releasably locking an element to said first formed member
     said means for supporting comprising a slot-like form having sides and a back with entry and exit cut-out portions parallel to each other and to one side of said body portion,
     said means for releasably locking comprising a slot-like form having sides and a back with entry and exit cut-out portions parallel to each other and to said entry and exit cut-out portions of said means for supporting, one side of said means for releasably locking being nonparallel to the other side so as to form a slot with a reducing cross-section dimension in a direction toward said means forming one side clamp,
   (b) a second formed member having:
     central portion,
     means forming a second side clamp of said two sided clamp for said object,
     support means and locking means extending from said second formed member,
   (c) said support means and locking means on said second formed member being formed to cooperate with said means for supporting and means for releasably locking on said first formed member so as to position said second side clamp to establish said two sided clamp with said one side clamp on said first formed member.

2. The clamp of claim 1 wherein said support means and locking means on said second formed member are separate means extending from said central portion,
   said support means having an elongated flat finger-like construction with smooth side surfaces, said locking means having an elongated flat finger-like construction with one side surface being smooth . and a second side surface formed with a series of teeth, said teeth having a flat surface facing toward said central portion and a sloping surface away from said central portion, said locking means extending from said central portion at an angle slightly less than perpendicular so as to be not parallel to said support means and so as to be spaced a greater distance from one side of said support means at the end thereof away from said central portion.

3. The clamp of claim 2 wherein said support means and said locking means are inserted into said means for supporting and means for releasably locking, respectively, said angle of said locking means with respect to said central portion causes said support means and said locking means to be releasably press fit into said means for supporting, and said teeth on the locking means being placed into cooperating alignment with said one side of said means for releasably locking with a flat surface of a tooth releasably engaging said one side.

4. A clipboard, clamp and object combination comprising, a clipboard having at least one flat surface,
a formed clamp assembly having,
(a) a first formed member including,
a body portion,
means for releasably fastening said first member to said work surface,
means forming one side clamp of a two sided clamp for said object,
and means for supporting and means for releasably locking an element to said first formed member comprising slot-like elements formed from the back of said body portion including a resilient latch portion formed from said slot-like element,
(b) a second formed member including,
a central portion,
means forming a second side clamp of said two sided clamp for said object,
support means and locking means extending from said second formed member comprising an elongated flat finger-like element having a series of detents formed thereon,
(c) and said support means and locking means on said second formed member being formed to cooperate with said means for supporting and means for releasably locking on said first formed member so as to position said second side clamp to establish said two sided clamp with said one side clamp on said first formed member,
and an object clamped in said clamp assembly and positioned in cooperating alignment with said clipboard.

5. The combination of claim 4 wherein said elongated finger-like element is adapted to be inserted into said slot-like elements with said detents in cooperating and releasable alignment with said resilient latch portion to establish said two sided clamp.

* * * * *